Dec. 29, 1959 W. E. SWIFT, JR 2,919,351
RADIO-ACTIVE GAUGING TEMPERATURE COMPENSATOR SYSTEM
Filed Sept. 13, 1957
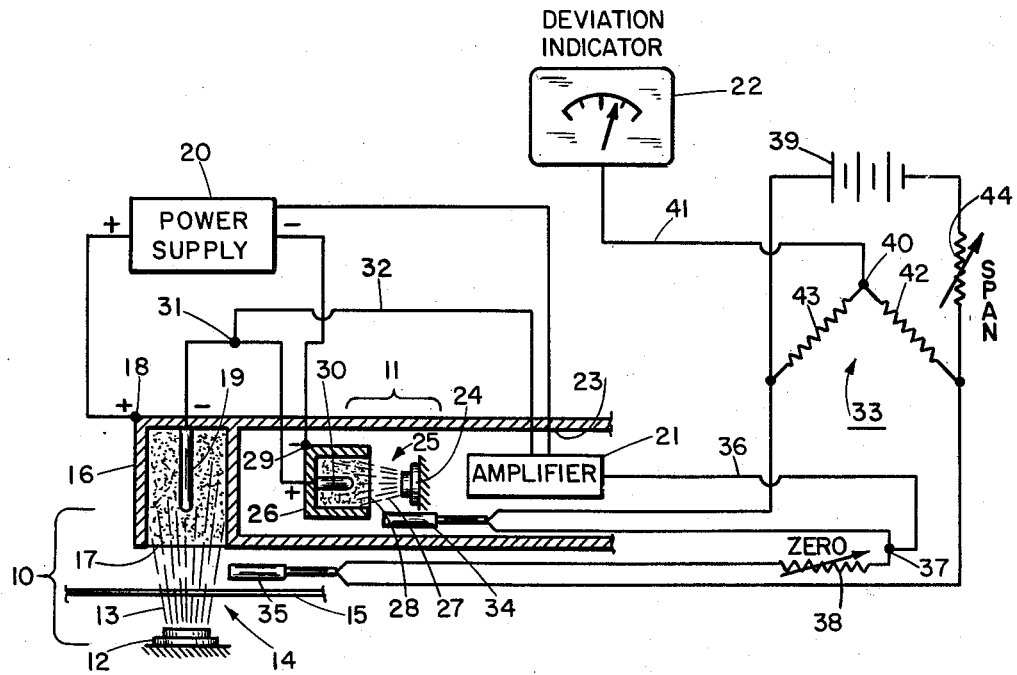
FIG. I
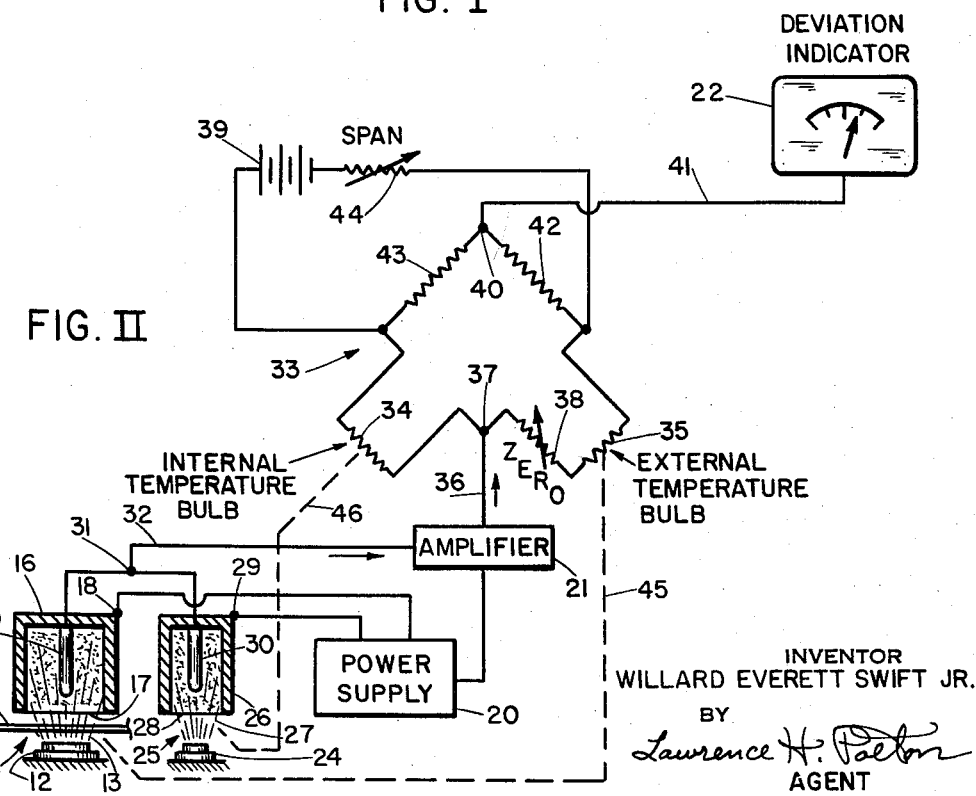
FIG. II
INVENTOR
WILLARD EVERETT SWIFT JR.
BY
Lawrence H. Patton
AGENT United States Patent Office 2,919,351
Patented Dec. 29, 1959

2,919,351

RADIO-ACTIVE GAUGING TEMPERATURE COMPENSATOR SYSTEM

Willard Everett Swift, Jr., Sharon, Mass., assignor to The Foxboro Company, Foxboro, Mass., a corporation of Massachusetts Application September 13, 1957, Serial No. 683,744

3 Claims. (Cl. 250—83.6)

This invention relates to radio-active devices for gauging sheet materials and has particular reference to such devices in combination with temperature compensation means therefor.

Such devices commonly use a reference unit for balancing out temperature and barometric pressure effects on a measuring unit. Thus air density changes in a measuring unit air gap are offset by like air density changes in a reference unit air gap.

A problem arises in that temperature changes often are effective on the measuring unit quickly, but on the reference unit more slowly, due to barriers such as housing walls.

This invention provides a system embodying additional, temporary, temperature compensation which operates to avoid measurement error during the delay period while a temperature change is achieving full effectiveness on the reference unit.

A specific area of this invention is in beta radiation gauging systems for measuring the area density, i.e., weight per unit area of sheet materials. Further, this invention relates to beta radiation gauging systems embodying measuring units each comprising a radio-active source and a radiation detector separated therefrom by a measuring air gap, and reference units each also comprising a radio-active source and a radiation detector and separated by a reference air gap. In such systems, the response of the measuring detector to variations in air density in the measuring air gap are indistinguishable from variations in the area density of the material being measured. This is the reason for the usual prior art provision of the reference unit, with an arrangement provided such that measuring air gap density changes due to temperature and barometric pressure changes are compensated for by like density changes in the reference air gap.

A usual measuring unit comprises a beta radiation source formed of radio-active material such as strontium 90, thallium 204, or krypton 85, with this source disposed on one side of the sheet material to be measured, and a detection device, such as an ionization chamber, disposed on the opposite side of the sheet material. Variations in the weight per unit area of the sheet material being measured cause changes in the amount of beta radiation reaching the measuring detector. The detector outputs are electrical and the measuring detector is connected in an electrical balance arrangement with the reference detector. The consequent differential signal is amplified and fed to an indicator, recorder, or controller, as desired. Such output signals are also customarily used, when desired, to operate a continuous self-balancing system which readjusts the radiation reaching the reference detector to maintain its output in balance with that from the measuring detector.

As a practical matter, a problem arises when a temperature change is applied to the prior art systems. There is often a substantial time lag between the usually almost instantaneous full effect of such change on the measuring air gap and the delayed full effect of the same change on the reference air gap. Such delay may be caused by any of several factors, one being that the reference unit is enclosed in a protective housing along with other portions of the system. Such delays may be of the order of an hour or more when the temperature change is caused by the start-up of a process machine which has been shut down for a time. In paper manufacture, for example, errors inherent in such prior art systems may easily result in the production of substantial quantities of off-weight paper.

This invention particularly relates to a system as described above, wherein special additional temperature compensation is provided. This extra temperature compensation is necessary because, as mentioned, temperature changes in such systems often do not immediately equally affect both the measurement and the reference air gaps. Barometric pressure changes do not present a problem in this respect since ordinarily there is negligible delay in barometrically equally affecting both the measurement and the reference air gaps.

In the prior art systems, the reference unit is operatively balanced against the measurement unit for a preselected zero condition. Thus the resulting differential signal is at a zero until the sheet being measured varies in area density and unbalances the system to produce an output signal which is representative of such area density variation.

The present invention provides means for modifying the above-mentioned output signal in accordance with changes in an established temperature relationship between the above-mentioned measuring and reference air gaps.

As an illustrative embodiment, this invention is accomplished by applying the above-mentioned output signal to a Wheatstone bridge in an electrical series arrangement. One leg of the Wheatstone bridge is a temperature sensitive resistance element located in the ambiency of the reference air gap and another leg of the Wheatstone bridge is another temperature sensitive resistance element located in the ambiency of the measuring air gap. Thus when the established temperature relation between the reference and measuring air gaps is disturbed, the above-mentioned Wheatstone bridge is unbalanced to modify the output signal in compensation for such disturbance.

Accordingly, when an overall temperature change occurs, with the measurement air gap subject to the new temperature quickly and the reference air gap subject to the new temperature after some delay, the system of the present invention modifies the output signal to the extent and for the time necessary to produce the apparent effect of continuously maintaining a pre-established temperature relation between the reference air gap and the measuring air gap.

It is, accordingly, an object of this invention to provide an improved beta gauging system.

Other objects and advantages of this invention will be in part apparent and in part pointed out hereinafter.

In the drawings:

Figure I is a partially schematic illustration of a gauging system according to this invention, illustrating certain structural relationships in the gauging unit of this device; and Figure II is a wholly schematic showing of the system of Figure I, illustrating the series arrangement of the temperature compensation Wheatstone bridge, according to this invention.

As in Figure I, the system of this invention includes a measurement combination 10 and a reference combination 11. The measurement combination 10 comprises a radio-active beta radiation gauging source 12 which is a solid body, charged with material such as thallium 204.

The source 12 emits beta radiations 13 which pass through a measurement air gap 14, and through a body of material 15, such as paper, which is under test in the gap 14, to and into a measuring ionization chamber 16 by way of a thin stainless steel beta radiation permeable window 17 in the ionization chamber 16. As stated, the material 15 may be paper, and the measured variable may be the area density of the paper.

The measurement ionization chamber 16 contains a gas such as argon or a mixture of nitrogen and argon and the beta radiation entering the chamber 16 ionizes the gas to a degree which is a factor of the area density of the paper being measured. Thus as the paper absorbs varying amounts of the measurement beta radiation, due to area density variation of the paper, the degree of ionization in the measurement chamber 16 is also varied. The measurement ionization chamber 16 is electrically suitably polarized as at a supply electrode 18 and a collector electrode 19. Accordingly, varying electrical current is produced in the measurement ionization chamber 16 in representation of the area density variation in the paper 15. For this purpose, suitable electrical connections are provided between a power supply 20, an output amplifier 21 and the measurement ionization chamber electrodes 18 and 19. The measurement ionization chamber (16) output is ordinarily thus amplified and then eventually thereafter is applied to a deviation indicator 22.

The measuring air gap 14 of the measuring combination 10 is sharply responsive to changes in ambient temperature because of its open arrangement. As previously mentioned, such temperature changes in the measuring air gap cause changes in the density of the air in the measuring air gap with corresponding increase or decrease in the amount of radiation passing therethrough and in the response of the measuring ionization chamber 16. This invention provides continuous automatic compensation for these changes as discussed hereinafter.

As in Figure I, the measuring ionization chamber 16 is a part of an overall housing which is provided with a separate chamber 23 which contains the reference combination of a second radio-active source 24, a reference air gap 25, and a reference ionization chamber 26. The ionization radiations from the reference source 24 are indicated at 27 and they enter the reference ionization chamber 26 through a beta radiation permeable stainless steel window 28. The reference ionization chamber 26 is, like the measuring ionization chamber 16, electrically polarized through a supply electrode 29 and a collector electrode 30. These electrodes are suitably connected to the power supply 20 and the amplifier 21, the collector electrode being connected to the amplifier 21 in common with, but in opposed polarity with, the connection from the measuring collector 19.

Thus a combined measurement is provided with the output of the measuring chamber 16 electrically bucked against the output of the reference chamber 26. In this arrangement, the opposite polarity collector electrodes 19 and 30 are electrically connected as at 31, and have from this point a common lead 32 to the amplifier 21. Thus the outputs of the measuring and reference chambers 16 and 26 are joined to provide a differential signal to which the deviation indicator 22 responds. The radiation from the reference source 24 reaching the reference ionization chamber 26, is adjusted by a shutter (not shown) to produce a current from chamber 26 so related to that from measurement chamber 16, with the desired weight of sheet 15 in the measuring gap, as to result in a null signal. Thereafter, variations in the area density of the sheet (15) being measured, will cause a deviation from the null signal. So long as the temperatures in the measuring and reference air gaps 14 and 25 remain unchanged, the deviation indicator will show area density changes correctly. Similarly, if the temperature of the air in both gaps vary in the same direction at the same rate and at the same time, the instrument will read correctly.

If, on the other hand, there is a sudden change in the temperature of the air in the measuring gap 14, as by turning on a fan or raising or lowering the temperature of the heating section of the process machine, there will be a change in the output of detector 16. Because of the time lag due to the housing 23 there will be no corresponding temperature change immediately in air gap 25. Therefore, no sufficient compensatory change is immediately provided in the output of the reference detector 26. This results in an erroneous signal through the amplifier 21. In order to compensate for this error, an equal and opposite signal must be injected into the system. In accordance with the present invention a series arranged Wheatstone bridge 33 is used for this purpose.

As schematically shown in Figure II, the output of the amplifier 21 leads to the deviation indicator 22 through the series connected Wheatstone bridge 33. This bridge is suitably adjusted with respect to the normal operating temperature of the measuring air gap 14 as related to the normal operating temperature of the reference gap 25 to ordinarily provide a null signal.

The Wheatstone bridge 33 is a temperature compensation device including an internal temperature responsive reference bulb of the resistance type indicated at 34 and located adjacent the reference air gap 25. The temperature bulb 34 forms one leg of the Wheatstone bridge and another, measuring, temperature sensitive resistance bulb 35 forms an adjacent leg of the Wheatstone bridge 33. In Figure I the bulb 35 is shown as located in the ambiency of the measuring air gap 14. The measuring unit bulb 35 is referred to in Figure II as the external temperature bulb. Leading from the amplifier 21, an output lead 36 is connected to the Wheatstone bridge 33 between the temperature bulbs 34 and 35 at a point 37. In the same Wheatstone bridge leg as the external, measuring, temperature bulb 35, a zeroing variable resistor 38 is provided as a means of cancelling out any normal operating temperature difference between the reference and measuring air gaps. The Wheatstone bridge 33 is supplied with direct current from a battery 39, across the midpoint of the Wheatstone bridge in the usual fashion. The output of the Wheatstone bridge is taken from a point 40 opposite the amplifier input connection 37 and extends through an output lead 41 to the deviation indicator 22. The other two legs of the Wheatstone bridge 33 are suitable electrical resistances 42 and 43. Also, in the circuit of the Wheatstone bridge battery direct current supply, a variable resistor 44 is provided as a span adjustment.

The thermometer bulb 35, which is a temperature responsive resistance, rapidly senses the change in the external or measuring air gap 14 and responds with a quick change in its resistance. The change in resistance of bulb 35 upsets the balance of the series arranged electrical bridge 33 and produces the desired compensatory signal. Assuming that the change in temperature surrounding the measuring air gap continues at the new value for an appreciable period of time, the housing 23 will gradually change in temperature, thereby changing the temperature of the air in the reference air gap 25. When the measuring and reference temperatures thus again achieve their original relation, the compensatory signal from the bridge 33 dies out.

The Figure II showing is provided with the same reference numerals as shown in Figure I since the various elements in Figures I and II are the same, the only difference in the figures being that Figure II is fully schematic. In Figure II the location of the external temperature bulb 35 in the ambiency of the measurement air gap 14 is indicated by dotted line 45, and similarly, the location of the internal temperature bulb 34 in the ambiency of the reference air gap 25 is indicated by dotted line 46.

This invention, therefore, provides a new and improved radio-active device with automatic temperature compensation.

As many embodiments may be made of the above invention and as changes may be made in the embodiment set forth above without departing from the scope of the invention, it is to be understood that all matter hereinbefore set forth or shown in the accompanying drawings is to be interpreted as illustrative only and not in a limiting sense.

I claim:

1. A temperature compensating radio-active gauging system comprising a measurement arrangement of a measurement radio-active source and a measurement ionization chamber, a temperature compensating reference arrangement of a reference radio-active source and a reference ionization chamber, with said reference arrangement somewhat enclosed and slower to change with ambient temperature changes, means for combining the outputs of said chambers, and additional auxiliary temperature compensation means for varying said combined output temporarily and in accordance with temporary departures from a preselected temperature relation between the temperature in the ambiency of said measuring unit and the temperature in the ambiency of said reference unit due to said slower response of said reference arrangement.

2. A temperature compensating radio-active gauging system comprising, in combination, a measuring arrangement of a measuring radiation source and a measuring ionization chamber with a measurement air gap therebetween, a reference arrangement of a reference radiation source, a reference ionization chamber and a reference air gap therebetween, with said reference arrangement somewhat enclosed and slower to change with ambient temperature changes, means for combining the outputs of said ionization chambers to provide a single output signal, and additional, auxiliary temperature compensation means comprising a Wheatstone bridge mounted for receiving said single output signal in series arrangement therewith, a direct current source and means to apply direct current therefrom to energize said Wheatstone bridge, said Wheatstone bridge including in one leg thereof an external temperature sensitive resistance bulb located in the ambiency of the said measurement air gap and in an adjacent leg thereof an internal temperature sensitive resistance bulb located in the ambiency of said reference air gap, whereby a temporary variation in a pre-established temperature relation between said air gaps due to said slower response of said reference arrangement results in a temporary upset condition of said Wheatstone bridge which modifies said single output signal, and means for measuring the output of said system beyond said Wheatstone bridge to provide continuously fully temperature compensated representations of changes in a measured variable with respect to materials under measurement in said measurement air gap.

3. A radio-active measurement system for measuring area density in sheet materials by passing beta radiations through such materials, wherein there is provided a measuring arrangement of a measuring radiation source and a measuring ionization chamber with a measuring air gap therebetween, a reference arrangement comprising a reference radiation source, a reference ionization chamber and a reference air gap therebetween, with said reference arrangement somewhat enclosed and slower to change with ambient temperature changes, and means for combining the outputs of said ionization chambers to produce a single output signal with respect to variations in area density of the sheet material under measurement, whereby said reference arrangement provides temperature and barometric pressure compensation in the form of changes in the density of the air in the reference air gap in predetermined relation to temperature and barometric pressure caused changes in the density of the air in the measurement air gap, said measurement system comprising, in combination, said measuring arrangement, said reference arrangement, said means for combining the outputs of said arrangements, and additional, auxiliary temperature compensation means for temporarily modifying said combined output in accordance with deviations from a pre-established normal temperature relationship between said measurement air gap and said reference air gap on a temporary and varying magnitude related basis due to said slower response of said reference arrangement, whereby the final output of said measurement system is provided with a value schedule which is the same as it would be if said measurement and reference air gaps respond equally rapidly to ambient temperature change and were continuously maintained in said pre-established temperature relationship, said output signal auxiliary modifying means comprising a Wheatstone electrical bridge in electrical series relationship in said measurement system with respect to the combined outputs of said reference and measurement arrangements, with one leg of said Wheatstone bridge including a temperature sensitive resistance located in the ambiency of the measurement air gap and an adjacent leg of said Wheatstone bridge including a temperature sensitive electrical resistance located in the ambiency of said reference air gap.

References Cited in the file of this patent

UNITED STATES PATENTS

| | | |
|---|---|---|
| 2,264,725 | Shoupp et al. | Dec. 2, 1941 |
| 2,789,230 | Hutchins | Apr. 16, 1957 |
| 2,800,591 | Gilman | July 23, 1957 |